United States Patent

[11] 3,539,233

[72] Inventor Stig Lennart Hallerback
     Vastra Frolunda, Sweden
[21] Appl. No. 767,794
[22] Filed Oct. 15, 1968
[45] Patented Nov. 10, 1970
[73] Assignee AB SKF (Aktiebolaget Svenska
     Kullagerfabriken)
     Goteborg, Sweden
     a corporation of Sweden
[32] Priority Oct. 18, 1967
[33] Sweden
[31] 14,228/67

[54] NEEDLE BEARING AND METHOD OF ASSEMBLING THE SAME
     2 Claims, 2 Drawing Figs.
[52] U.S. Cl. .................................................. 308/213
[51] Int. Cl. .................................................. F16c 15/00
[50] Field of Search ........................................... 300/212,
     213, 217, 218

[56] References Cited
     UNITED STATES PATENTS
2,897,581  8/1959  Cowles et al. ................. 308/212

Primary Examiner—Fred C. Mattern, Jr.
Assistant Examiner—Frank Susko
Attorney—Howson and Howson ABSTRACT: A needle bearing consisting of a thin-walled flanged outer race ring and a cage for retaining and guiding the needles characterized thereby that its outer race ring is made from thin-walled tubing, for example automatically welded tubing and is provided with flanges by rolling or form pressing, the said bearing having a needle cage made of similar material and having a plurality of axially extending crossbars interconnected at each end by an annular cage portion the outer diameter of which before assembly in the bearing is less than the inner diameter of the flanges of the outer race ring, at least one of the said annular portions of the cage having an outer diameter less than the diameter of the circle which can be inscribed within the set of needles when the latter are located in the outer race ring, the annular portions of the cage after introduction of the cage into the outer race ring being expanded between the flanges of the said outer race ring whereby an extension of the annular portions of the cage will take place mainly between the crossbars thereby altering the cross section and form of the said annular portions.

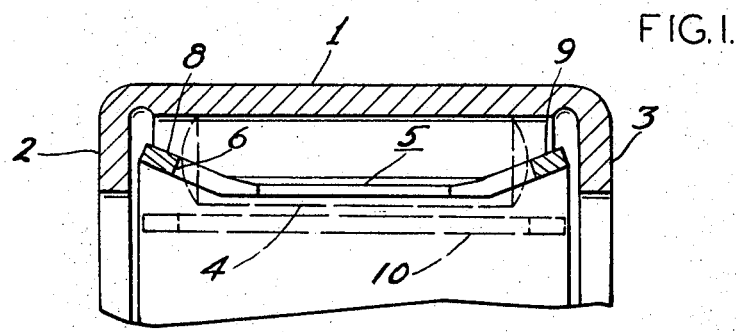
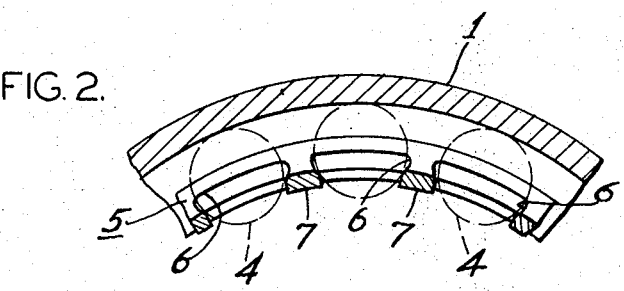
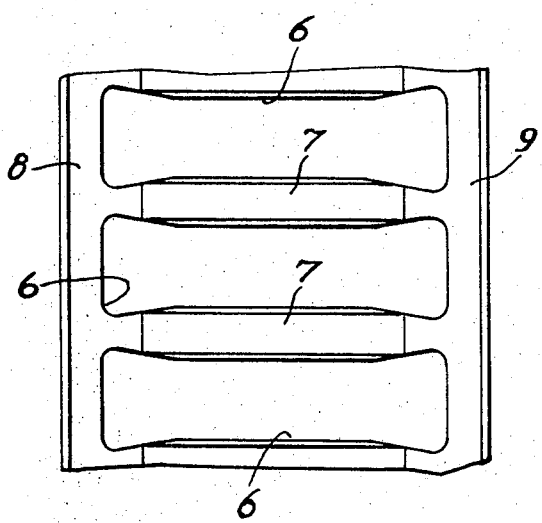

INVENTOR:
STIG LENNART HALLERBACK
BY
Howson & Howson
ATTYS.

NEEDLE BEARING AND METHOD OF ASSEMBLING THE SAME

The present invention relates to a needle bearing having a thin-walled flanged outer race ring and a cage for retaining and guiding the needles.

Various types of needle bearings with thin-walled outer race rings are known, for instance bearings in which the outer race ring consists of a drawn seamless sleeve and in which the cage is also made from a drawn seamless sleeve.

The purpose of the present invention is to provide a bearing which can be easily and cheaply made and assembled and is characterized mainly thereby that its outer race ring is made from thin-walled tubing, for example automatically welded tubing, and is provided with flanges by rolling or form pressing, the said bearing having a needle cage made of similar material and having a plurality of axially extending crossbars interconnected at each end by an annular cage portion the outer diameter of which before assembly in the bearing is less than the inner diameter of the flanges of the outer race ring, at least one of the said annular portions of the cage having an outer diameter less than the diameter of the circle which can be inscribed within the set of needles when the latter are located in the outer race ring, the annular portions of the cage after introduction of the cage into the outer race ring being expanded between the flanges of the said outer race ring whereby an extension of the annular portions of the cage will take place mainly between the crossbars thereby altering the cross section and form of the said annular portions.

The invention is more fully described in the following with reference to the accompanying drawings in which:

FIG. 1 shows a partial section in an axially extending plane through a needle bearing according to the invention.

FIG. 2 is a cross section through a portion of the bearing.

FIG. 3 shows a portion of the cage having a pair of pockets for the needles.

Figure 6:
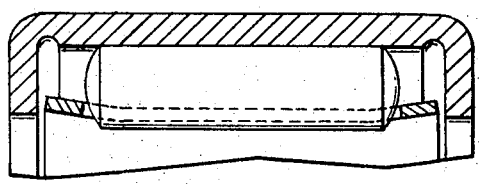
FIG. 6 shows a cross section through a finished needle bearing.

The needle bearing according to FIG. 1 has an outer race ring 1 which may be conveniently made from a piece of automatically welded tubing and having side flanges 2 and 3 which may be made by a rolling or press forming operation and which serve to confine the needles axially. A cage 5 is provided within the race ring to retain the rollers in the bearing and guide them during running. This cage 5 may also be made from automatically welded tubing in which pockets 6 have been punched as shown in FIG. 6 leaving axially extending crossbars 7 which separate the pockets. The crossbars are interconnected at their respective ends by annular portions 8 and 9 of the cage. FIG. 2 shows the manner in which the crossbars 7 retain and guide the needles 4 in the cage 5.

The assembly of the cage 5 in the outer race ring 1 may be carried out in the following manner. When the cage is introduced into the race ring its outer diameter is less than the diameter of the circle which can be inscribed in the set of rollers when they are assembled in the outer race ring 1. This is illustrated in FIG. 1 in which the cage is indicated by chain lines at 10.

Figure 4:
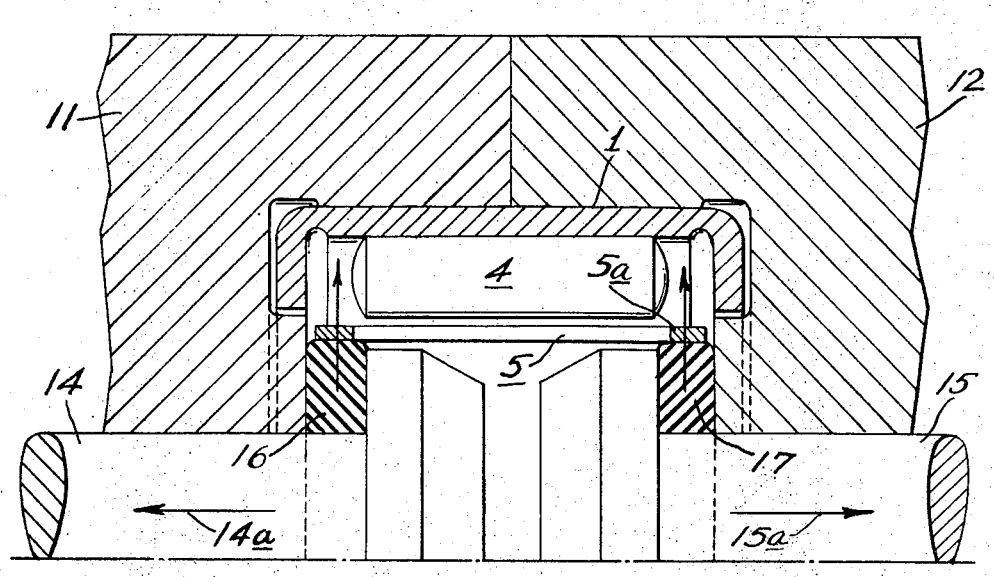
FIGS. 4 and 5 show a tool for assembling the cage in the bearing by the method of the invention.

By means of an elastic medium forming part of a tool as illustrated in FIG. 4, which will be described later, the annular portions 8 and 9 of the cage are forced outwards to an expanded position in which they form axial limitations for the rollers and at the same time assume such a position in the outer ring that axial escapement of the needles and cage from the bearing is prevented. The crossbars of the cage are located during the assembling operation relative to the needles so that each crossbar will be located between a pair of needles being less than the width of the crossbar. The annular portions of the cage are so dimensioned that they will spring back a suitable amount when the pressure from elastic means located within the assembling tool is relieved whereby all metallic contact between the axially extending crossbars and the needles ceases. Where the crossbars connect with the annular portions of the cage they are shaped so that when the annular portions are elastically expanded these ends will have an outwardly directed curvature suitable for the function of the bearing, for example thereby that the portions of the crossbars adjacent to the annular portions of the cage will be of less width than at other portions of their length. The annular portions of the cage may also be formed so that the stretching which takes place in the portions between the crossbars may be of the desired homogeneity. In order properly to locate the cage relative to the needles during the assembly operation while the annular portions of the cage still have diameters less than that of the inscribed circle the crossbars may be slightly crowned. After assembly the cage will assume the appearance shown in FIGS. 1 and 6, i.e. the annular portions, and possibly also the adjacent portions of the crossbars, will be turned outwards a certain angle relative to the substantially straight or slightly crowned remaining portions of the crossbars. During the above mentioned assembly operation certain change in the thickness and diameter of the cage has taken place.

Figure 5:
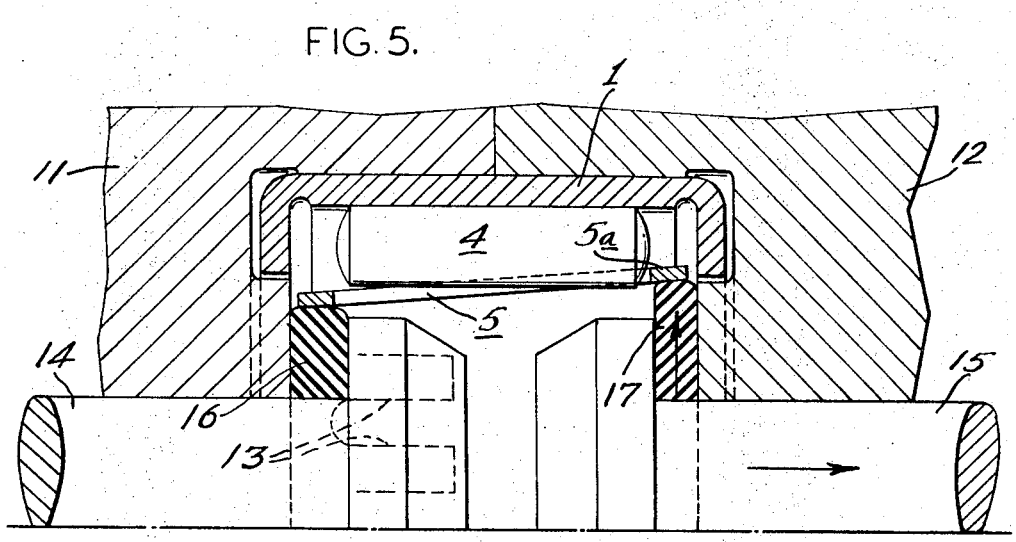

The principle on which the assembly tool is designed is apparent from FIG. 4. As shown it comprises two cups 11 and 12 between which the outer race ring of the needle bearing is located. A preliminary step of the assembly operation is shown in FIG. 5 which shows a guide tool 13 having axially extending locating fingers introduced from one side of the assembling tool by the aid of which the needles 4 are held and located in the outer race ring 1. The cage 5 is then inserted within the set of needles. The assembly tool is provided with a pair of plungers 14 and 15 on which are mounted in any suitable manner elastic members 16 and 17 for expanding the annular portions 5a of the cage outwards. In the first step the elastic member (for instance 17 in the plunger 15) at one side of the tool is compressed while the guide tool 13 still centers the needles in position and thereby expands one of the annular portions 5a of the cage outwards into the outer race ring. The cage will thus assume a more or less conical shape and can take over the duty of guiding the needles. The guide tool may now be removed and the plunger 14 with its elastic member 16 may be brought into function and the plungers 14 and 15 are forced apart as indicated by the arrows 14a and 15a in FIG. 4, whereby the elastic members 16 and 17 are compressed axially and swell radially and thereby expand the annular portions of the cage until the cage assumes approximately the appearance shown in FIG. 6. In order to ensure that the correct expansion and thereby a certain angle between the annular portions and the remainder of the cage is attained stop washers (not shown) are arranged in a suitable manner relative to the plungers so that the latter can move sideways only a certain predetermined distance corresponding to the desired deformation of the elastic members.

I claim:

1. A needle bearing consisting of a thin-walled flanged outer race ring and a cage for retaining and guiding the needles characterized thereby that its outer race ring is made from thin-walled tubing, for example automatically welded tubing and is provided with flanges by rolling or form pressing, the said bearing having a needle cage made of similar material and having a plurality of axially extending crossbars interconnected at each end by an annular cage portion the outer diameter of which before assembly in the bearing is less than the inner diameter of the flanges of the outer race ring, at least one of the said annular portions of the cage having an outer diameter less than the diameter of the circle which can be inscribed within the set of needles when the latter are located in the outer race ring, the annular portions of the cage after introduction of the cage into the outer race ring being expanded between the flanges of the said outer race ring whereby an extension of the annular portions of the cage will take place mainly between the crossbars thereby altering the cross section and form of the said annular portions.

2. Method of assembling needle bearings according to claim 1, characterized thereby that the cage of the bearing is caused to expand by means of a mandrel of elastic material introduced into the bearing, which mandrel is brought into contact with the needles of the bearing by subjecting it to thrust after which the annular portions of the cage are expanded to desired diameter through further expansion of the said elastic members after which the pressure on the elastic mandrel is relieved thereby enabling it to resume its original form, and the mandrel is removed from the bearing whereby the residual springiness in the cage will cause it to spring back sufficiently to provide desired clearance between the cage, the needles and the outer race ring.